United States Patent
Maeda (10) Patent No.: US 7,788,355 B2
(45) Date of Patent: Aug. 31, 2010

(54) PRINT CONTROL PROGRAM CONTROLLING PRINTER CONNECTED TO NETWORK

(75) Inventor: Toshihiro Maeda, Sakai (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1039 days.

(21) Appl. No.: 10/743,787

(22) Filed: Dec. 24, 2003

(65) Prior Publication Data

US 2005/0068565 A1 Mar. 31, 2005

(30) Foreign Application Priority Data

Sep. 26, 2003 (JP) ............... 2003-335564

(51) Int. Cl.
*G06F 15/173* (2006.01)
(52) U.S. Cl. ............... 709/223; 709/221; 709/222; 709/228; 715/736; 715/853
(58) Field of Classification Search ............ 355/401; 358/1.14, 1.15, 1.16, 437; 399/8, 9; 711/202, 711/215; 709/212, 217, 219, 220, 221, 222, 709/223, 224, 227, 228, 245, 250; 715/736, 715/853
See application file for complete search history.

(56) References Cited

U.S. PATENT DOCUMENTS

| | | | | |
|---|---|---|---|---|
| 5,580,177 A * | 12/1996 | Gase et al. | ............... | 400/61 |
| 5,828,863 A * | 10/1998 | Barrett et al. | ............... | 703/24 |
| 6,301,012 B1 * | 10/2001 | White et al. | ............... | 358/1.15 |
| 6,389,544 B1 * | 5/2002 | Katagiri | ............... | 713/300 |
| 6,742,028 B1 * | 5/2004 | Wang et al. | ............... | 709/223 |
| 6,814,510 B1 * | 11/2004 | Sabbagh et al. | ............... | 400/63 |
| 6,868,509 B2 * | 3/2005 | Gale et al. | ............... | 714/43 |
| 6,915,514 B1 * | 7/2005 | Machida | ............... | 717/174 |
| 6,917,626 B1 * | 7/2005 | Duvvury | ............... | 370/466 |
| 6,973,487 B2 * | 12/2005 | Kimura | ............... | 709/221 |
| 7,401,113 B1 * | 7/2008 | Appiah et al. | ............... | 709/203 |
| 7,606,880 B2 * | 10/2009 | Shima | ............... | 709/220 |
| 2002/0062366 A1 * | 5/2002 | Roy et al. | ............... | 709/224 |
| 2002/0188759 A1 * | 12/2002 | Roy et al. | ............... | 709/245 |
| 2003/0005097 A1 | 1/2003 | Barnard et al. | | |
| 2003/0196117 A1 * | 10/2003 | Kenmochi et al. | ............... | 713/201 |

(Continued)

FOREIGN PATENT DOCUMENTS

JP 2000-033755 2/2000

(Continued)

OTHER PUBLICATIONS

Notice of Ground of Rejection issued in a corresponding Japanese appliction, and translation thereof, Jan. 27, 2006.

*Primary Examiner*—Michael Won
(74) *Attorney, Agent, or Firm*—Buchanan Ingersoll & Rooney PC (57) ABSTRACT

When a personal computer (PC) fails in transmission of print direction to a printer or interactive communications, the following process is carried out. If there is no DHCP server, the printer on a network is searched for by broadcasting, using information specific to the printer. If a change in an IP address of the printer is detected, the printer-specific information within the PC is updated, and print port setting is updated. This can cope with the change in the IP address of the printer connected to the network.

15 Claims, 5 Drawing Sheets

U.S. PATENT DOCUMENTS

| | | | |
|---|---|---|---|
| 2007/0206514 A1* | 9/2007 | Onishi | 370/254 |
| 2007/0211285 A1* | 9/2007 | Shipton | 358/1.15 |

FOREIGN PATENT DOCUMENTS

| | | |
|---|---|---|
| JP | 2000-222149 | 8/2000 |
| JP | 2002-123380 | 4/2002 |
| JP | 2002-297465 | 10/2002 |
| JP | 2003-150352 | 5/2003 |

\* cited by examiner

PRINT CONTROL PROGRAM CONTROLLING PRINTER CONNECTED TO NETWORK

This application is based on Japanese Patent Application No. 2003-335564 filed with Japan Patent Office on Sep. 26, 2003, the entire content of which is hereby incorporated by reference.

BACKGROUND OF THE INVENTION

1. Field of the Invention

The present invention relates to a recording medium recording a print control program, and to a printing device. In particular, the present invention relates to a recording medium recording a print control program capable of flexibly coping with a change in an IP (Internet Protocol) address of a printing device connected to a network, and to the printing device.

2. Description of the Related Art

There is conventionally known a technique of connecting a PC (Personal Computer), a printing device such as an MFP (Multi Function Peripheral), a printer, a facsimile apparatus or the like, and a DHCP (Dynamic Host Configuration Protocol) server in a network environment, and assigning an IP address to each device by the DHCP server.

The IP address of the printing device assigned by the DHCP server may be changed for an unexpected reason. The IP address of the printing device may also be changed in a network in which a DHCP server is not used, due to various reasons. If such a change has been made, there arises a case where printing or communications cannot be carried out when a person directs a printing job from a PC or tries to obtain information of the printing device at the PC via interactive communications.

To avoid such a case, Japanese Laid-Open Patent Publication No. 2002-123380 discloses a technique in which a device with its IP address having been changed notifies a PC of the changed information.

Further, Japanese Laid-Open Patent Publication No. 2000-222149 discloses a technique in which, if an IP address of a printer has been changed while a PC is turned off, a MAC (Media Access Control) address is used to access the printer when the PC is turned on, and a new IP address is obtained from the printer to rewrite the stored IP address.

However, in the technique disclosed in the Japanese Laid-Open Patent Publication No. 2002-123380, the PC should always be in a standby state for being notified of the change in the IP address. When the change in the IP address is to be notified, the notification would not be provided effectively if the PC is not connected onto a network, if the PC is powered off, or if the PC is powered on but not in a state capable of receiving the notification of the change.

Further, in the technique disclosed in the foregoing Japanese Laid-Open Patent Publication No. 2000-222149, since the MAC address is assigned to a network interface card (NIC), the MAC address will be changed when the NIC is changed, causing the IP address of the printer to become unknown.

SUMMARY OF THE INVENTION

The present invention has been made to solve the aforementioned problems. An object of the present invention is to provide a recording medium recording a print control program capable of flexibly coping with a change in an IP address of a printing device, and the printing device.

To achieve the foregoing object, according to one aspect of the present invention, a print control program recorded on a recording medium causes a computer to execute the steps of detecting a change in an IP address of a printing device connected to a network, and searching for the printing device over the network after the change in the IP address is detected, using information specific to the printing device.

According to another aspect of the present invention, a printing device includes a detector detecting a change in an IP address, a recorder recording a past IP address as specific information when the change in the IP address has been made, and a responder retrieving the recorded past IP address upon an inquiry from an external device and making a response.

According to still another aspect of the present invention, a print control program recorded on a recording medium causes a computer to execute the steps of determining whether or not it is possible to establish communications with a printing device connected to a network and preset to be available for the communications, and, when it is determined impossible to establish the communications, transmitting a command for obtaining information specific to the printing device on the network to search for the printing device, and identifying an IP address of the printing device based on the information specific to the printing device included in a response to the command.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter, a preferred embodiment of the present invention will be described in detail with reference to the drawings.

In the present embodiment, when an IP address of a printer (as an example of a printing device) has been changed, a print control program installed in a PC automatically obtains the changed information, and updates the setting of the PC. The print control program also notifies a print control program on another PC connected to the same network of the changed information.

Further, the print control program searches for the printer over the network based on printer-specific information other than a MAC address (for example, a name, a specific ID, a former IP address, and/or a network port number of the printer). Therefore, the printer can be searched for with flexibility, even if a NIC has been changed.

More specifically, a PC provided with a printer driver in accordance with the present embodiment has the following functions.

(1) a function to determine whether a target printer is powered off or an IP address of the printer has been changed when communications with the target printer fail to be established.
(2) a function to search for and find the target printer when the IP address has been changed.
(3) a function to notify another PC of the changed information when finding the printer.
(4) a function to send the notice again when failing to notify the another PC.

Figure 1:
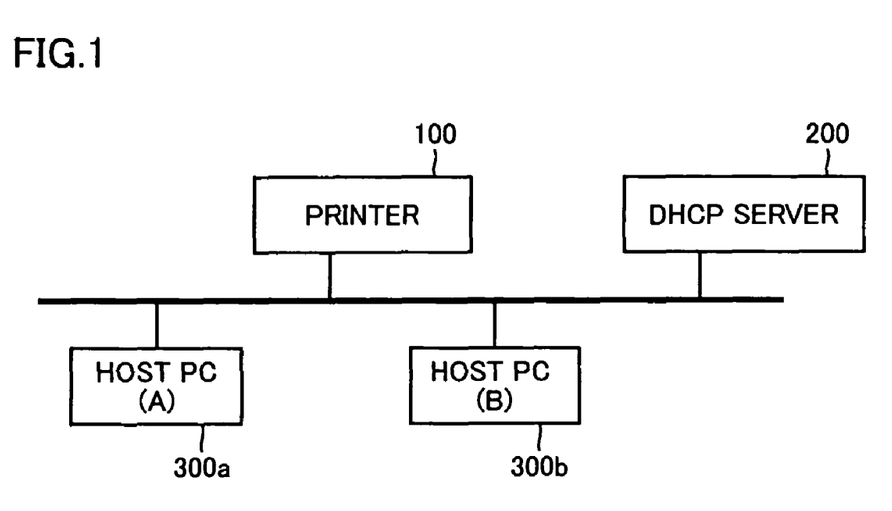
FIG. 1 shows a configuration of a print system in an embodiment of the present invention.

Referring to FIG. 1, the print system includes a printer (which is a printing device and may also be an MFP, a copying machine, a facsimile apparatus or the like) 100, a DHCP server 200, and host PCs 300a and 300b, which are connected to a network.

Figure 2:
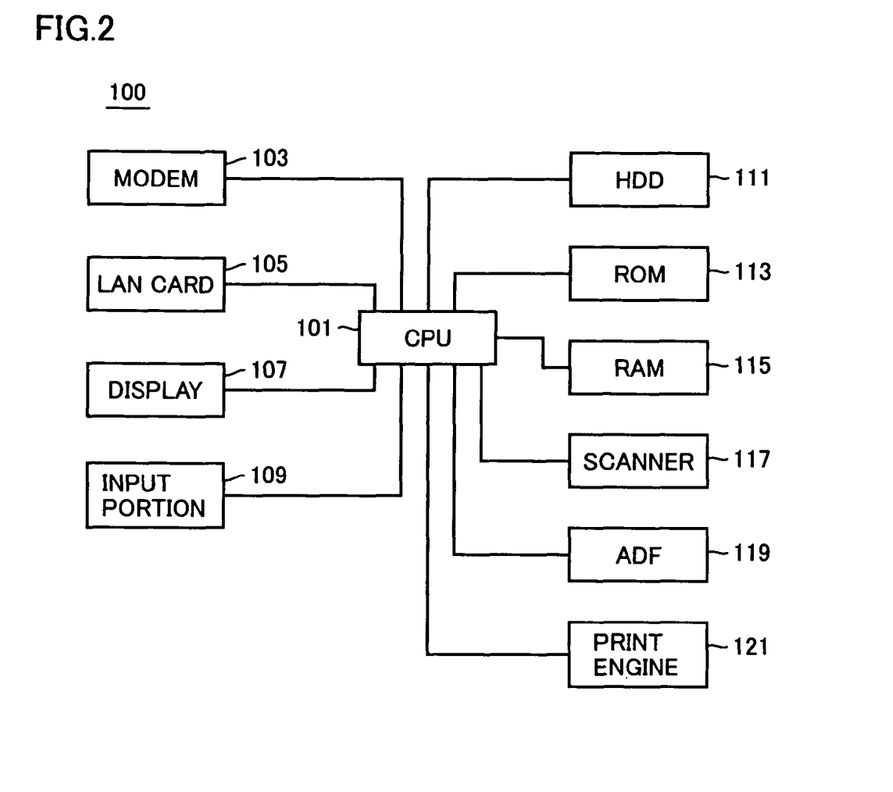
FIG. 2 is a block diagram showing a hardware configuration of a printer 100 in FIG. 1.

FIG. 2 is a block diagram showing a hardware configuration of printer 100 in FIG. 1.

Referring to FIG. 2, printer 100 includes a CPU (Central Processing Unit) 101 for total device control, a modem 103 for connection to a general public line, a LAN (Local Area Network) card 105 for connection to the Internet and a LAN, a display 107 displaying necessary information to a user, an input portion 109 made up of keys or the like with which the user inputs information necessary for the operation of the device, a hard disk 111 storing printing data and the like, a ROM (Read Only Memory) 113 storing a program and the like, a RAM (Random Access Memory) 117 temporarily storing data, a scanner 117 for reading a document, an ADF (Automatic Document Feeder) 119, and a print engine 121 for printing image data.

Figure 3:
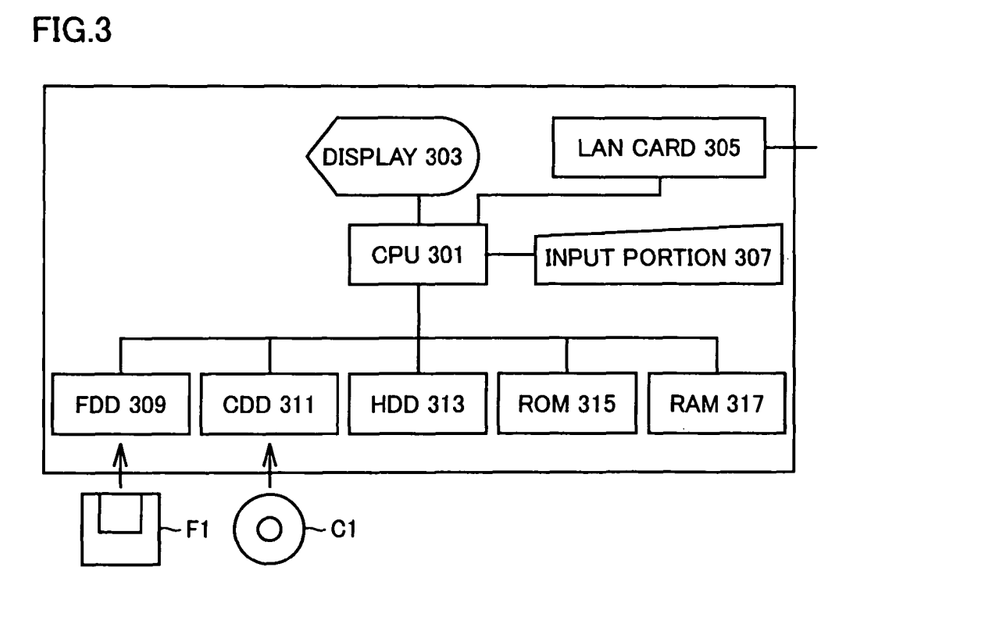
FIG. 3 is a block diagram showing a hardware configuration of one of host PCs 300a and 300b in FIG. 1.

FIG. 3 is a block diagram showing a hardware configuration of one of host PCs 300a and 300b in FIG. 1.

Referring to FIG. 3, the host PC includes a CPU 301 for total device control, a display 303, a LAN card 305 for connection to a LAN, an input portion 307 made up of a keyboard, a mouse and the like, a flexible disk drive 309, a CD-ROM (Compact Disk Read Only Memory) drive 311, a hard disk 313, a ROM 315, and a RAM 317.

Image data, a program and the like recorded on a flexible disk (F1) can be read by means of flexible disk drive 309. Image data, a program and the like recorded on a CD-ROM (C1) can be read by means of CD-ROM drive 311.

Figure 4:
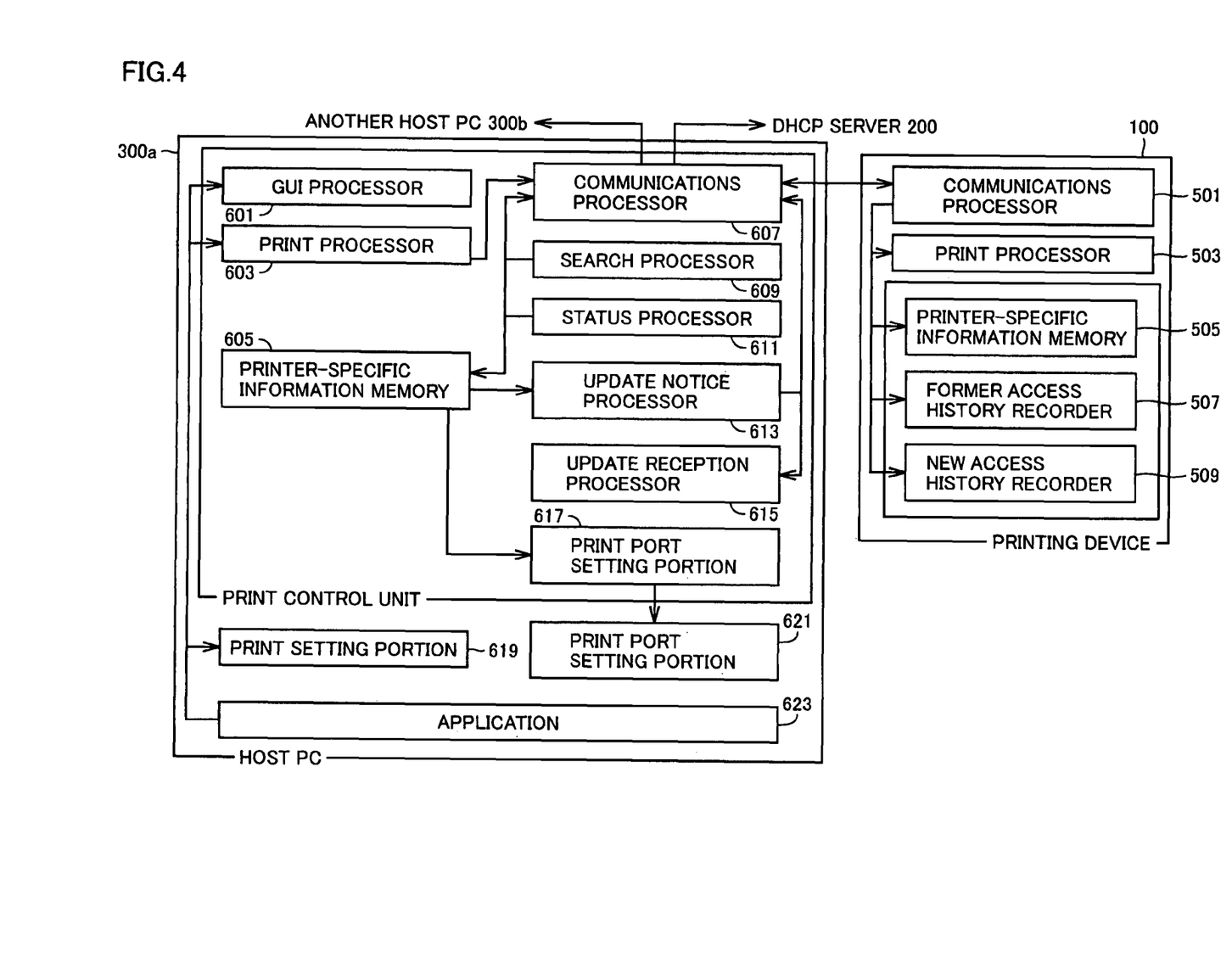
FIG. 4 is a block diagram illustrating a functional configuration of printer 100 and one of host PCs 300a and 300b in FIG. 1.

FIG. 4 is a block diagram illustrating a functional configuration of printer 100 and one of host PCs 300a and 300b in FIG. 1.

Referring to FIG. 4, host PC 300a has a print control unit (or a printer driver) provided therein. The print control unit includes a GUI (Graphical User Interface) processor 601, a print processor 603, a printer-specific information memory 605, a communications processor 607, a search processor 609, a status processor 611, an update notice processor 613, an update reception processor 615, and a print port setting portion 617.

Host PC 300a also has a print setting portion 619, a print port setting portion 621, and an application 623.

Printer 100 includes a communications processor 501, a print processor 503, a printer-specific information memory 505, a former access history recorder 507, and a new access history recorder 509.

Printer-specific information memory 605 included in the print control unit within PC 300a holds information specific to printer 100 connected to the network, such as a name, a specific ID, a MAC address, an IP address, and a network port number of the printer. Printer-specific information memory 605 obtains and stores such information while communications can be established normally between the PC and the printer (during execution of printing or during interactive communications).

Printer-specific information memory 505 within printer 100 holds printer-specific information such as its own printer name, its own specific ID, the MAC address, its IP address, its former IP address, and the network port number.

If the printer does not respond when a printing job has been directed via the PC or interactive communications have been tried to be established, status processor 611 accesses a DHCP server, if any, on the network, and searches for a new IP address of the printer.

If there is no DHCP server, search processor 609 conducts a search on a network address using the printer-specific information, finds out the corresponding printer, and updates the contents of printer-specific information memory 605.

If the contents of printer-specific information memory 605 have been updated, print port setting portion 617 uses the obtained IP address to automatically update the print port setting via print port setting portion 621 within PC 300a.

If the contents of printer-specific information memory 605 have been updated, update notice processor 613 also retrieves the difference between the contents of former access history recorder 507 and those of new access history recorder 509 in printer 100, determines a PC on the network having not-updated printer-specific information, and sends an update notice to a print control unit (or a printer driver) in the PC. Update reception processor 615 of the PC to which the update notice has been sent processes the update notice and updates the contents of printer-specific information memory 605 in the PC.

If the PC does not respond even though update notice processor 613 sends a notice, update notice processor 613 sends the notice again after a certain amount of time.

As such, the system according to the present embodiment has the following characteristics.

(1) When the IP address of the printer has been changed, the print control unit automatically retrieves a changed IP address and changes the print port setting on the PC, allowing for automatic port setting without requiring an operation by the user.
(2) Since determination as to whether the IP address of the printer has been made or the printer is powered off can be determined, malfunction of the print control unit can be prevented, and the status of the printer can be notified to the user.
(3) Since the system employs a method that the print control unit obtains information of the printer, it is possible, when the IP address of the printer has been changed, to obtain a changed IP address surely and automatically at a required timing.
(4) Since the obtained information can be sent to another PC, the updated information can be transmitted quickly within the same network.
(5) When the communications with the another PC fail, the notice is sent again, thereby ensuring notification within the network.

Figure 5:
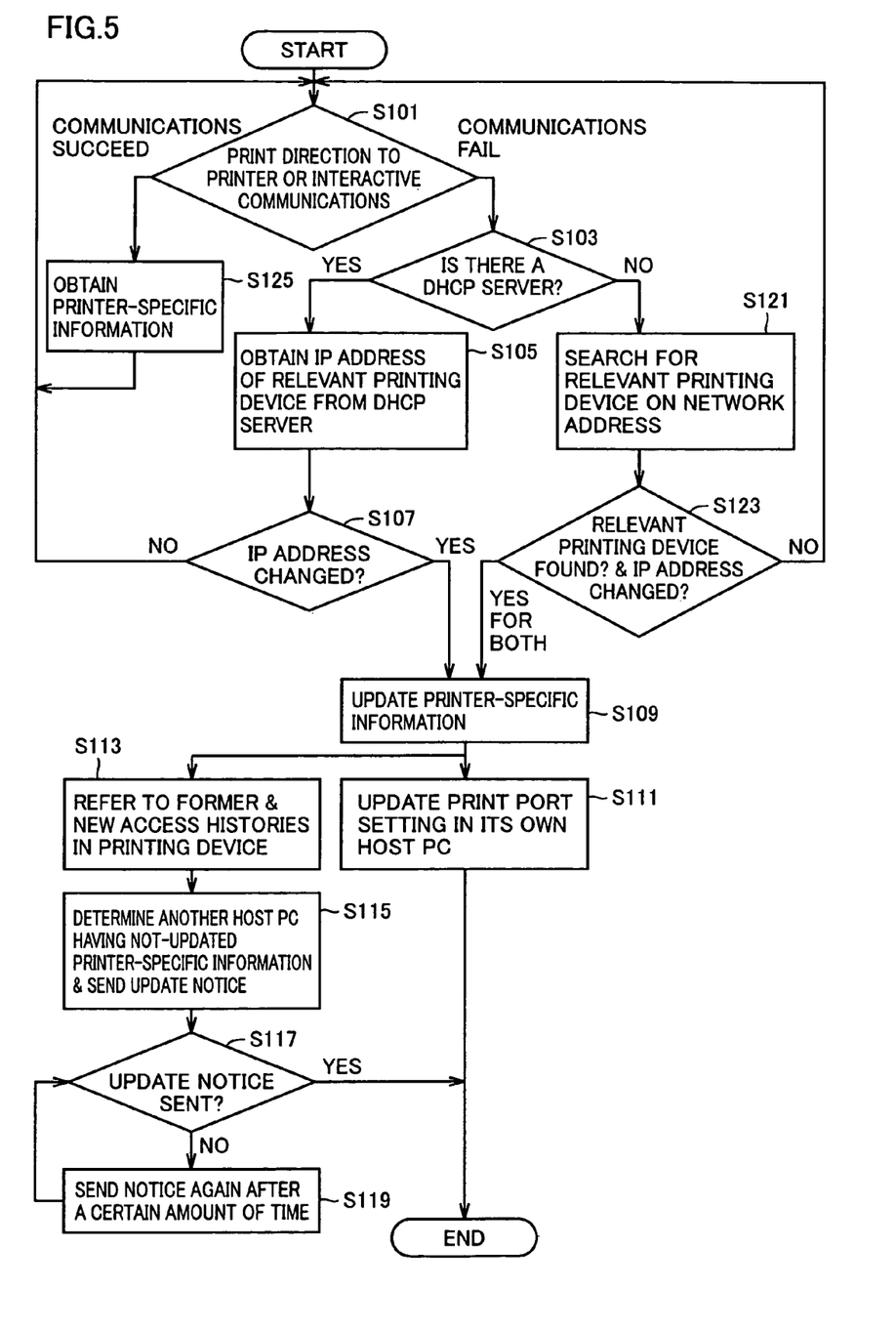
FIG. 5 is a flow chart showing a process performed by a print control unit (or a printer driver) in the PC.

FIG. 5 is a flow chart showing a process performed by the print control unit (or the printer driver) in the PC.

Referring to FIG. 5, in step S101, a printing job is directed to the printer or interactive communications are tried to be established. If the communications succeed, the process proceeds to step S125, in which printer-specific information is obtained from printer-specific information memory 505 in printer 100 and the contents of printer-specific information memory 605 in the PC are updated. The process then goes back to step S101.

If the communications fail in step S101, the print control unit determines that the IP address of the printer may have been changed, and determines whether there is a DHCP server on the network in step S103.

If there is a DHCP server, the IP address of the relevant printer is obtained from the DHCP server in step S105.

When the IP address recorded on the DHCP server does not match the IP address stored in printer-specific information memory 605 and thus it is determined that the IP address has been changed (YES) in step S107, the process proceeds to step S109.

On the other hand, if NO in step S107, it is determined that the printer is powered off, and the process goes back to step S101 without updating the contents of printer-specific information memory 605.

If it is determined in step S103 that there is no DHCP server, the relevant printer is searched for on the network address by broadcasting in step S121 (which will be described later in detail).

If the relevant printer is found and its IP address is found to have been changed (YES FOR BOTH) in step S123, the process proceeds to step S109.

If NO in step S123, the process goes back to step S101.

In step S109, the contents of printer-specific information memory 605 are updated with newly obtained printer-specific information. Next, in step S111, the print port setting within the PC is updated by means of print port setting portion 621.

In step S113, former and new access histories within the printer are referred to. In step S115, another host PC having not-updated printer-specific information is determined, and an update notice is sent to the PC.

In step S117, it is determined whether the update notice has succeeded. If YES, the process ends, and if NO, the process proceeds to step S119, in which the notice is sent again after a certain amount of time, and then the process goes back to step S117.

It is to be noted that, instead of the PC, printer 100 may carry out the processing in the steps from S113 to S119 of FIG. 5.

Figure 6:
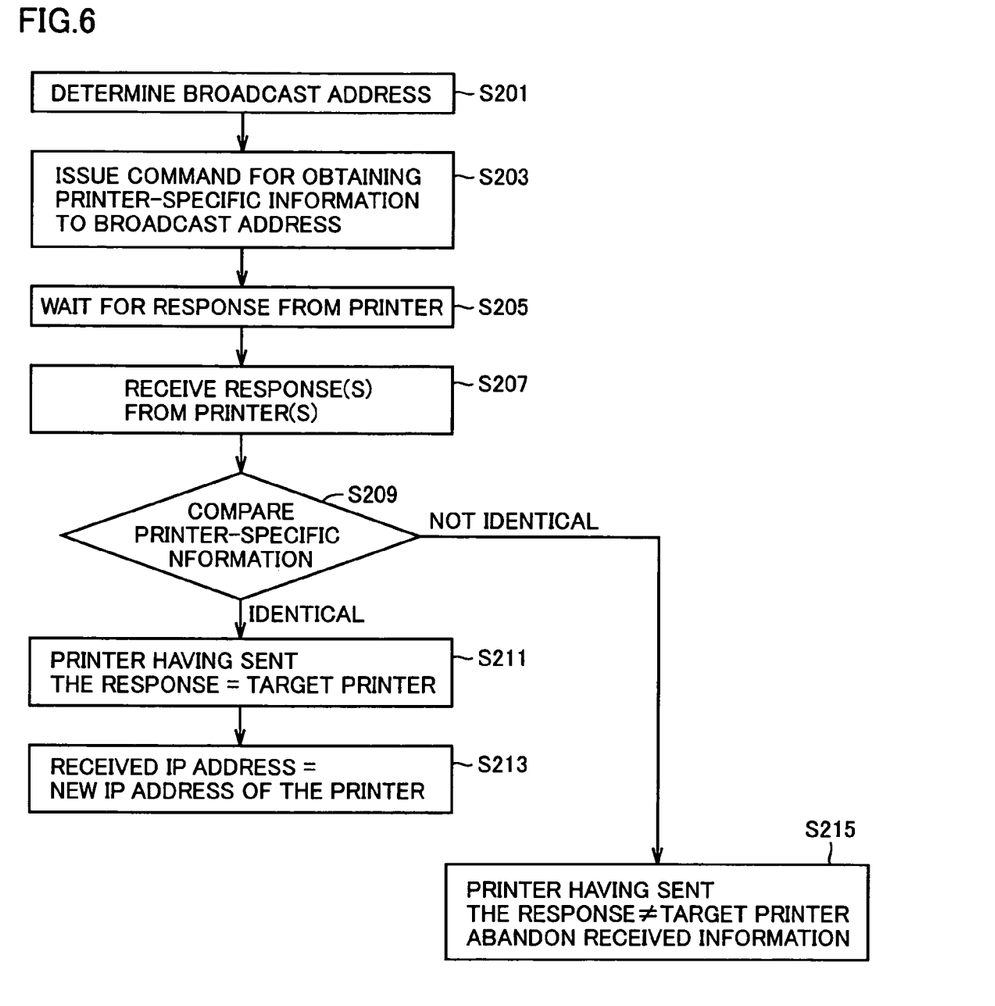
FIG. 6 is a flow chart showing processing in step S121 of FIG. 5 in detail.

FIG. 6 is a flow chart showing the processing in step S121 of FIG. 5 in detail.

An address for broadcasting is determined in step S201, and a command for obtaining printer-specific information is issued to the broadcast address in step S203.

A response from the printer is waited in step S205, and the response from the printer is received in step S207 (there is a possibility that a plurality of responses may be received).

In step S209, the printer-specific information obtained from the response from the printer is compared with the printer-specific information stored in printer-specific information memory 605. If they are found to be identical, the printer having sent the response is determined as the target printer which has been searched for in step S211, and the IP address of the printer having sent the response is determined as a new IP address of the printer in step S213.

On the other hand, if these pieces of the printer-specific information are found not to be identical in step S209, the printer having sent the response is determined as not being the target printer and the received information is abandoned in step S215.

In the processing in FIG. 6, the broadcast address is determined from the IP address and a subnet mask on the host PC, and the print control unit on the host PC issues the command for obtaining printer-specific information to the broadcast address. Thus, the command for obtaining printer-specific information is issued to all the printers on the network.

The printer having received the command for obtaining printer-specific information sends its own printer-specific information back to the issuer of the command. The printer-specific information includes information such as the name of the printer, its specific ID, its former IP address and the like. All the responses are received by the print control unit on the host PC which has issued the command. The received printer-specific information is compared with the printer-specific information of the target printer, and the printer which has sent the response having the same information is determined as the desired (target) printer.

As has been described, in the present embodiment, when communications from a PC to a printer such as print processing and interactive communications fail to be established due to a change in an IP address of the printer or the like, a changed IP address is retrieved automatically and a print port on the PC is set automatically. Further, since the changed information is repeatedly notified to a print control unit on another host on the network, the setting change information can be transmitted on the network surely and quickly, without a manual setting operation by a user.

It is to be noted that, in order to confirm whether the newly found printer is the target printer, matching on all of the name, the specific ID, the MAC address, the former IP address, and the network port number of the printer may be checked between the contents of printer-specific information memory 505 in the newly found printer and the contents of printer-specific information memory 605 within the PC. Alternatively, the matching may be checked on a combination of more than one piece of such information.

Further, the former IP address of the printer is stored in printer-specific information memory 505 in the printer and collated with the contents of printer-specific information memory 605 in the PC, thereby allowing for more secure matching.

It is to be noted that a program executing the process shown in the flow chart in the foregoing embodiment can be provided. The program may be stored in a recording medium such as a CD-ROM, a flexible disk, a hard disk, a ROM, a RAM, a memory card or the like, to be provided to a user. Further, the program may be downloaded to a device via a communications line such as the Internet or the like.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A printing control device, comprising:
   a printer-specific information storage unit storing printer-specific information which identifies a printer, the printer specific information including at least one of a name, a specific ID, a former IP address, and a network port number of the printer;
   a search unit for locating a printer connected to a network and obtaining printer-specific information from the printer connected to the network;
   a comparing unit comparing the printer-specific information for the located printer obtained by the search unit with the printer-specific information of a particular printer stored in the printer-specific information storage unit, and determining if the located printer is the particular printer;
   an update unit obtaining new printer-specific information about the located printer searched for by the search unit, and updating corresponding information stored in the printer-specific information storage unit to the new printer-specific information when the comparing unit determines that the located printer is the particular printer; and wherein, said search unit locates the printer connected to the network and obtains printer-specific information from the printer connected to the network and the comparing unit compares the printer-specific information for the located printer with the printer-specific information of the particular printer when it is determined that there is no DHCP server on the network.

2. The printing control device according to claim 1, further comprising:

a setting update unit updating a printer port setting based on the information updated in the update unit.

3. The printing control device according to claim 1, further comprising:

a judging unit judging whether the particular printer is powered off or if an IP address of the particular printer has been changed when communications with the printer fail.

4. The printing control device according to claim 1, further comprising:

a notifying unit, notifying another device on the network of the new printer-specific information about the located printer updated by said update unit.

5. The printing control device according to claim 4, wherein said notifying unit includes a reading unit reading a former access history record and a new access history record from the located printer searched for by said search unit;

a determining unit that determines if the device has un-updated printer-specific information based on differences between the former access history record and the new access history record read by said reading unit, and said notifying unit notifies the device of the new printer-specific information.

6. A method for controlling a printing device, comprising:

storing printer-specific information which identifies a printer, the printer-specific information including at least one of a name, a specific ID, a former IP address, and a network port number of a printer in a printer-specific information storage unit;

locating a printer connected to a network and obtaining printer-specific information from the printer connected to the network via a search unit;

comparing the printer-specific information for the located printer obtained by the search unit with the printer-specific information of a particular printer stored in the printer specific-information storage unit via a comparing unit and determining if the located printer is the particular printer;

obtaining, via an update unit, new printer-specific information about the located printer searched for by the search unit and updating corresponding information stored in the printer-specific information storage unit to the new printer-specific information when the comparing unit determines that the located printer has identical printer-specific information to the particular printer; and wherein said search unit locates the printer connected to the network and obtains printer-specific information from the printer connected to the network and the comparing unit compares the printer-specific information for the located printer with the printer-specific information of the particular printer when it is determined that there is no DHCP server on the network.

7. The method for controlling a printing device according to claim 6, further comprising:

updating a printer port setting with a setting up date unit based on the information updated in the update unit.

8. The method for controlling a printing device according to claim 6, further comprising:

judging whether the particular printer is powered off or if an IP address of the particular printer has been changed via a judging unit when communications with a printer failed.

9. The method for controlling a printing device according to claim 6, further comprising:

notifying another device on the network of the new printer-specific information about the located printer updated by the update unit via a notifying unit.

10. The method for controlling a printing device according to claim 9, further comprising:

reading a former access history record and a new access history record from the located printer searched for by the search unit;

determining if a device has un-updated printer-specific information based on the differences between the former access history record and the new access history record read by the reading unit; and notifying the device of the new printer-specific information via the notifying unit.

11. A computer readable medium storing computer program instructions which when executed by a computer programmed with the instructions, causes the computer to perform the following steps:

storing printer-specific information which identifies a printer, the printer specific information including at least one of a name, a specific ID, a former IP address, and a network port number of a printer, in a printer-specific information storage unit;

locating a printer connected to a network and obtaining printer-specific information from the printer connected to the network via a search unit;

comparing the printer-specific information for the located printer obtained by the search unit with the printer-specific information of a particular printer stored in the printer-specific information storage unit via a comparing unit and determining if the located printer is the particular printer; and obtaining, via an update unit, new printer-specific information about the located printer searched for by the search unit and updating corresponding information stored in the printer-specific information storage unit to the new printer-specific information when the comparing unit determines that the located printer has identical printer-specific information to the particular printer; and determining if a DHCP server is on the network;

said search unit locates the printer connected to the network and obtains printer-specific information from the printer connected to the network and the comparing unit compares the printer-specific information for the located printer with the printer-specific information of the particular printer when it is determined that there is no DHCP server on the network.

12. The computer readable medium according to claim 11, further comprising computer program instructions which when executed by a computer programmed with the instructions causes the computer to:

update a printer port setting with a setting up date unit based on the information updated in the update unit.

13. The computer readable medium according to claim 11, further comprising computer program instructions which when executed by a computer programmed with the instructions causes the computer to:
    judge whether the particular printer is powered off or if an IP address of the particular printer has been changed via a judging unit when communications with a printer failed.

14. The computer readable medium according to claim 11, further comprising computer program instructions which when executed by a computer programmed with the instructions causes the computer to:
    notify another device on the network of the new printer-specific information about the located printer updated by the update unit via a notifying unit.

15. The computer readable medium according to claim 11, further comprising computer program instructions which when executed by a computer program with the instructions causes the computer to:
    read a former access history record and a new access history record from the located printer searched for by the search unit;
    determine if a device has un-updated printer-specific information based on the differences between the former access history record and the new access history record read by the reading unit; and
    notify the device of the new printer-specific information via the notifying unit.

\* \* \* \* \*